(12) United States Patent
Wehage

(10) Patent No.: US 8,307,735 B2
(45) Date of Patent: Nov. 13, 2012

(54) BICYCLE STEM

(75) Inventor: Kristopher Wehage, Woodinville, WA (US)

(73) Assignee: Tien Hsin Industries Co., Ltd., Taichung County (TW)

( * ) Notice: Subject to any disclaimer, the term of this patent is extended or adjusted under 35 U.S.C. 154(b) by 219 days.

(21) Appl. No.: 12/723,795

(22) Filed: Mar. 15, 2010

(65) Prior Publication Data

US 2011/0219908 A1 Sep. 15, 2011

(51) Int. Cl.
*B62K 21/16* (2006.01)
(52) U.S. Cl. ..................................... 74/551.3
(58) Field of Classification Search ............... 74/551.1, 74/551.3, 551.4, 551.6; 280/279, 280; 403/83, 403/88, 97, 98
See application file for complete search history.

(56) References Cited

U.S. PATENT DOCUMENTS

| 1,232,871 | A | * | 7/1917 | Watters | ........................... 403/97 |
| 5,509,328 | A | * | 4/1996 | Lai | ............................... 74/551.3 |
| 5,515,744 | A | * | 5/1996 | Liao | ............................ 74/551.3 |

FOREIGN PATENT DOCUMENTS

TW 570010 1/2004

\* cited by examiner

*Primary Examiner* — Vicky Johnson
(74) *Attorney, Agent, or Firm* — Rosenberg, Klein & Lee

(57) ABSTRACT

A bicycle stem includes a steerer tube base including a pivotal end having a pivotal hole and two blocking devices provided in the pivotal end and slightly protruding from an inner side of the pivotal hole. A clamp arm includes a coupled end pivotally coupled to the pivotal end. A lock unit includes two lock sleeves, an engaged bolt disposed in the pivotal hole of the pivotal end and a blocking element for preventing the engaged bolt from detaching from the pivotal end. The lock unit is operable between a first position and a second position. In the first position of the lock unit, the clamp arm is fixed and can not pivot with respect to the steerer tube base, and in the second position of the lock unit, the clamp arm is able to pivot with respect to the steerer tube base.

19 Claims, 9 Drawing Sheets

BICYCLE STEM

BACKGROUND OF THE INVENTION

1. Field of the Invention

The present invention relates to a bicycle stem.

2. Description of the Related Art

Taiwan utility model publication No. 570010 discloses a straight element 10, a holding rod 20, two tightness elements 30 and 31, a bolt 40 and an elastic element 42. The bolt 40 is inserted in the tightness element 30 though the elastic element 42 and engaged with the tightness element 31. Then, the elastic element 42 is pressed in an engagement position of the tightness elements 30 and 31. Further, while the tightness elements 30 and 31 are operated to a disengagement position by loosening the bolt 40, the elastic element 42 is released and presses the tightness elements 30 and 31 outwardly and respectively.

However, during loosening the bolt 40, the outward elastic force of the elastic element 42 might not be even to press on the two tightness elements 30 and 31, and it causes an unsmooth disengagement of the tightness elements 30 and 31 from the straight element 10 and the holding rod 20. Thus, the straight element 10 will not pivot with respect to the holding rod 20 smoothly. Hence, the present invention provides an improved bicycle stem.

SUMMARY OF THE INVENTION

In view of the foregoing background, it is therefore an object of the invention to provide a bicycle stem. The bicycle stem includes a steerer tube base, a clamp arm and a lock unit pivotally coupling the steerer tube base to the clamp arm. The steerer tube base includes a mounted end mounted on a steerer tube of a bicycle and a pivotal end having a pivotal hole and two blocking devices provided in the pivotal hole. The blocking devices slightly protrude from the inner surface of the pivotal hole.

The clamp arm includes a coupled end pivotally connected to the pivotal end of the steerer tube base and a holder end for holding on a handle bar of the bicycle. The coupled end consists of two spaced lateral walls and a receptacle adapted for receiving the pivotal end of the steerer tube base. Each lateral wall forms a connected bore.

The lock unit includes two lock sleeves, an engaged bolt forming an annular groove on the center of the outer periphery thereof and a blocking element inserted through the pivotal end and restricted in the annular groove of the engaged bolt. Each lock sleeve has an inner threaded surface engaged with an end of the engaged bolt and an outer toothed surface engaged with the pivotal hole and the connected bore.

In one aspect of the present invention, the lock unit can be operated to be in a first position or a second position via a hand tool. In the first position of the lock unit, the lock sleeves are engaged with the pivotal hole of the pivotal end and the connected bores of the coupled end simultaneously. Then, the steerer tube base is fixed in position and prevented from pivoting with respect to the clamp arm. In the second position, the engaged bolt is driven to rotate with respect to the pivotal end and drives the lock sleeves to disengage from the pivotal hole of the pivotal end. Then, the clamp arm is able to pivot with respect to the steerer tube base and is positioned at a desired angle related to the clamp arm.

In another aspect of the present invention, an outer diameter of the engaged bolt is smaller than an inner diameter of the pivotal hole which is smaller than an inner diameter of each blocking device. Thus, the engaged bolt can only be restricted by the blocking element and not move with respect to the pivotal hole.

In another aspect of the present invention, the inner diameter of each blocking device is smaller than an outer diameter of each lock sleeve. While, the lock unit is in the first position, a side of each lock sleeve that is adjacent to the inside of the pivotal hole abuts against the related blocking device, and the lock sleeve is prevented from being further inserted toward the annular groove of the engaged bolt. The two lock sleeves can not be inserted into the pivotal hole completely.

Other objects and advantages of the present invention will become obvious to the reader, and it is intended that these objects and advantages are within the scope of the present invention.

To the accomplishment of the above and related objects, this invention may be embodied in the form illustrated in the accompanying drawings, with attention being called to the fact, however, that the drawings are illustrative only, and that changes may be made in the specific construction illustrated and described within the scope of the appended claims.

BRIEF DESCRIPTION OF THE DRAWINGS

The present invention will be described through detailed illustration of the preferred embodiments referring to the drawings.

DETAILED DESCRIPTION OF THE PREFERRED EMBODIMENTS

Figure 1:
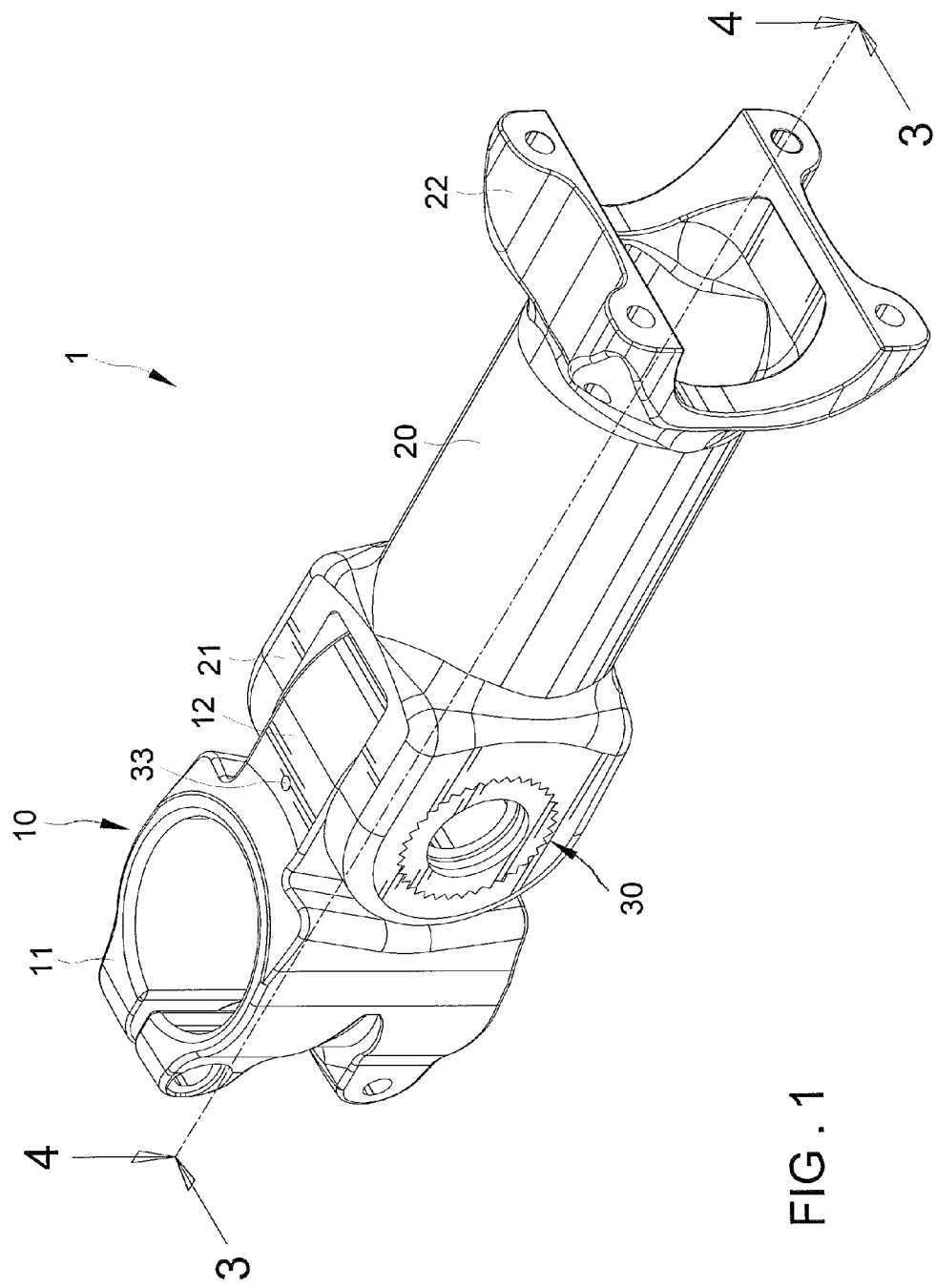
FIG. 1 is a perspective view of a bicycle stem according to the preferred embodiment of the present invention.
Figure 2:
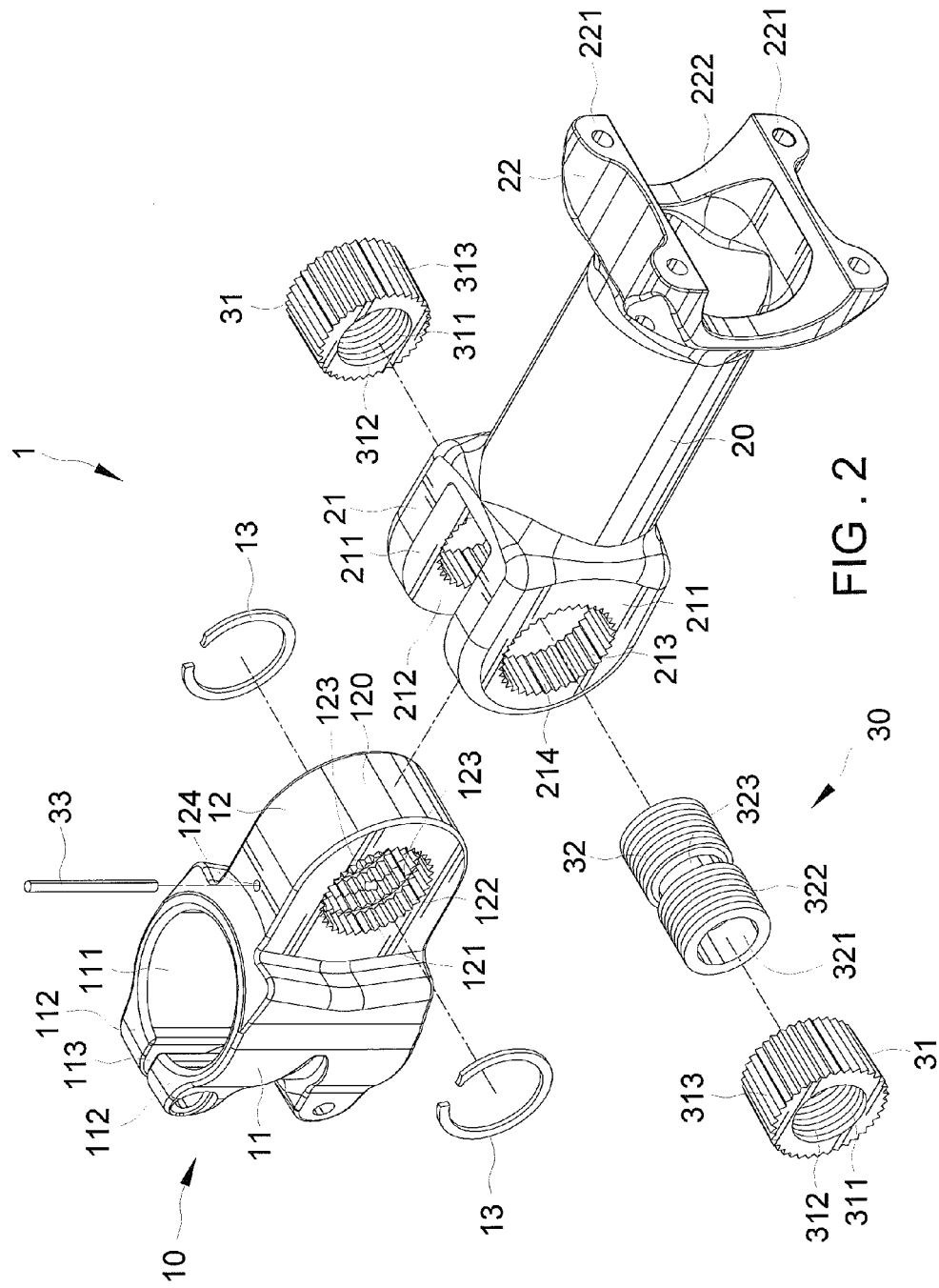
FIG. 2 is an exploded view of the bicycle stem as shown in FIG. 1.
Figure 3:
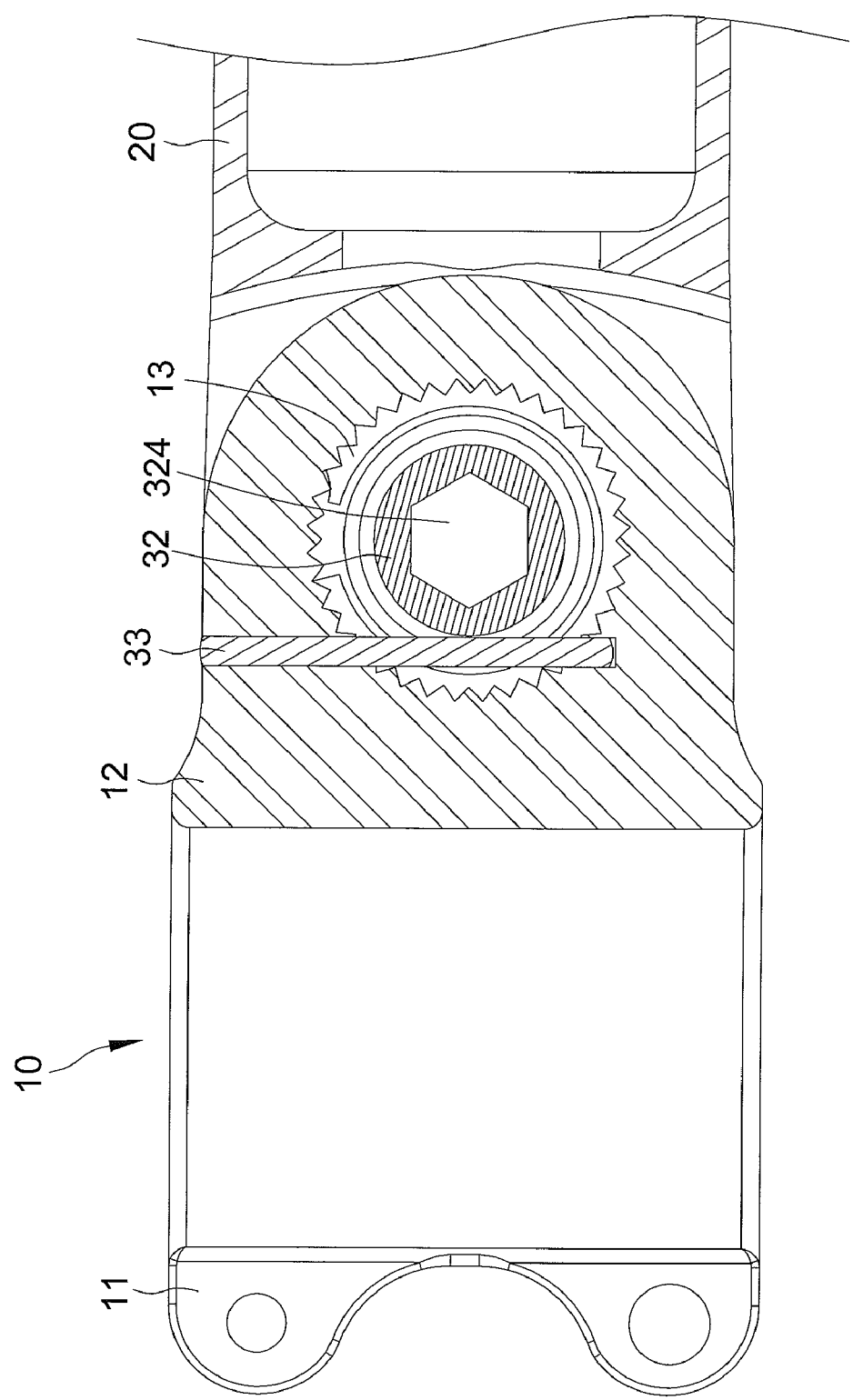
FIG. 3 is a cross-sectional view taken along line 3-3 in FIG. 1.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

FIGS. 1 through 4 show a bicycle stem 1 which includes a steerer tube base 10, a clamp arm 20 and a lock unit 30 adapted to pivotally connect the clamp arm 20 to the steerer tube base 10.

The steerer tube base 10 includes a mounted end 11 adapted to couple to a steerer tube of a bicycle (not shown) and a pivotal end 12 extending from a side of the mounted end 11 and adapted to couple to the clamp arm 20. A through-hole 111 is longitudinally formed at the mounted end 11 and includes two lateral walls 112. A gap 113 is defined between the distal ends of the lateral walls 112. While mounting the mounted end 11 onto the steerer tube, a width of the gap 113 can be enlarged, and the lateral walls 112 are spaced from each other. A pivotal hole 121 penetrates the pivotal end 12, and a direction of the through-hole 111 is perpendicular to that of the pivotal hole 121. A toothed surface 122 is formed on the inner periphery of the pivotal hole 121. Two slots 123 are formed on the toothed surface 122 axially and annularly and spaced from each other. An aperture 124 is formed on the top of the pivotal end 12 and communicates with the pivotal hole 121. A direction of the aperture 124 is parallel to that of the through-hole 111 and perpendicular to that of the pivotal hole 121.

Two blocking devices 13 are received in the two slots 123 respectively, and each blocking device 13 has a thickness T. Each slot 123 is a slightly depressed annular slot defined in the pivotal hole 121 and has a depth D which is slightly larger than the thickness T of each blocking device 13. Thus, while the blocking devices 13 are set in the slots 123, each blocking device 13 will protrude from the toothed surface 122. Moreover, the two blocking devices 13 could also be integrally formed into the center portion as a step (or shoulder) in the pivotal hole 121.

The clamp arm 20 includes a coupled end 21 and a holder end 22 which are respectively formed on two ends of the clamp arm 20 and opposite to each other. The coupled end 21 is adapted to couple to the pivotal end 12 of the steerer tube base 10. The coupled end includes two lateral walls 211 spaced from each other and a receptacle 212 defined between the lateral walls 211 and receiving an inserter portion 120 of the pivotal end 12. The inserter portion 120 has an arc distal end for a smooth pivotal action in the receptacle 212. Two connected bores 213 are formed on the two lateral walls 211 of the coupled end 21 respectively and correspond to each other and the pivotal hole 121. Thus, the lock unit 30 can be inserted into the connected bores 213 and the pivotal hole 121. Further, the pivotal end 12 and the coupled end 21 are pivotally joined together. In this case, the distal end of each lateral wall 211 is arcuate. Hence, it provides a smoother pivot action of the combination of the steerer tube base 10 and the clamp arm 20. The holder end 22 forms two spaced distal sections 221 and a recess 222 defined between the distal sections 221. A profile of the recess 222 corresponds to part of the outer periphery of a handle bar of the bicycle, and the distal sections 221 can clamp on the outer periphery of the handle bar. The clamp arm 20 can be held on the handle bar of the bicycle via the holder end 22 of the clamp arm 20. Each connected bore 213 has an inner toothed surface 214.

The lock unit 30 includes two lock sleeves 31, an engaged bolt 32 and a blocking element 33. The engaged bolt 32 is inserted into the pivotal hole 121 of the pivotal end 12, and two ends of the engaged bolt 32 are exposed from the pivotal end 12 and respectively engaged with the two lock sleeves 31. Each lock sleeve 31 is engaged with the related connected bore 213 and the related end of the engaged bolt 32.

Each lock sleeve 31 includes a through-hole 311 axially formed therethrough and with an inner threaded surface 312 and an outer toothed surface 313 formed on the outer periphery thereof. The engaged bolt 32 includes a channel 321 axially formed therethrough, an outer threaded periphery 322 formed on the outer periphery thereof, an annular groove 323 defined on the outer threaded periphery 322 between the two ends of the engaged bolt 32 and a hexagonal hole 324 formed inside thereof and communicating with the channel 321. The blocking element 33 is inserted through the aperture 124 and the pivotal hole 121 of the pivotal end 12 and restricted in the annular groove 323 to prevent the engaged bolt 32 from moving with respect to the pivotal hole 121.

In use, because an outer diameter of the engaged bolt 32 is smaller than an inner diameter of the pivotal hole 121 which is smaller than an inner diameter of each blocking device 13, the engaged bolt 32 can only be restricted by the blocking element 33 and not move with respect to the pivotal hole 121. The outer toothed surface 313 of each lock sleeve 31 is engaged with the toothed surface 122 of the pivotal end 12, and the inner threaded surface 312 of each lock sleeve 31 is engaged with the outer threaded periphery 322 of the related end of the engaged bolt 32. Because the protruding blocking device 13 is disposed in the pivotal hole 121, the two lock sleeves 31 will not insert into the pivotal hole 121 completely (as shown in FIG. 4).

Figure 4:
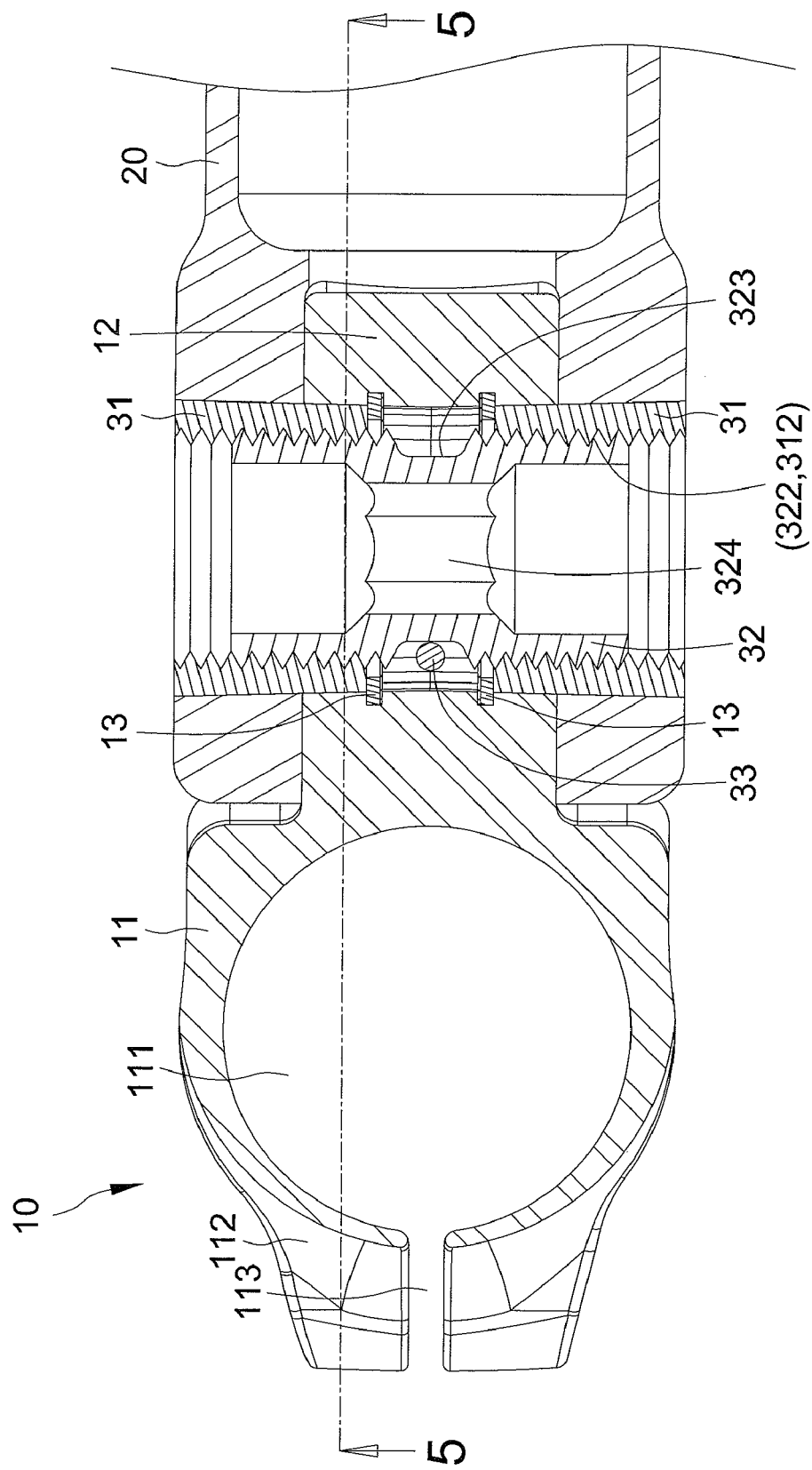
FIG. 4 is a cross-sectional view taken along line 4-4 in FIG. 1.
Figure 5:
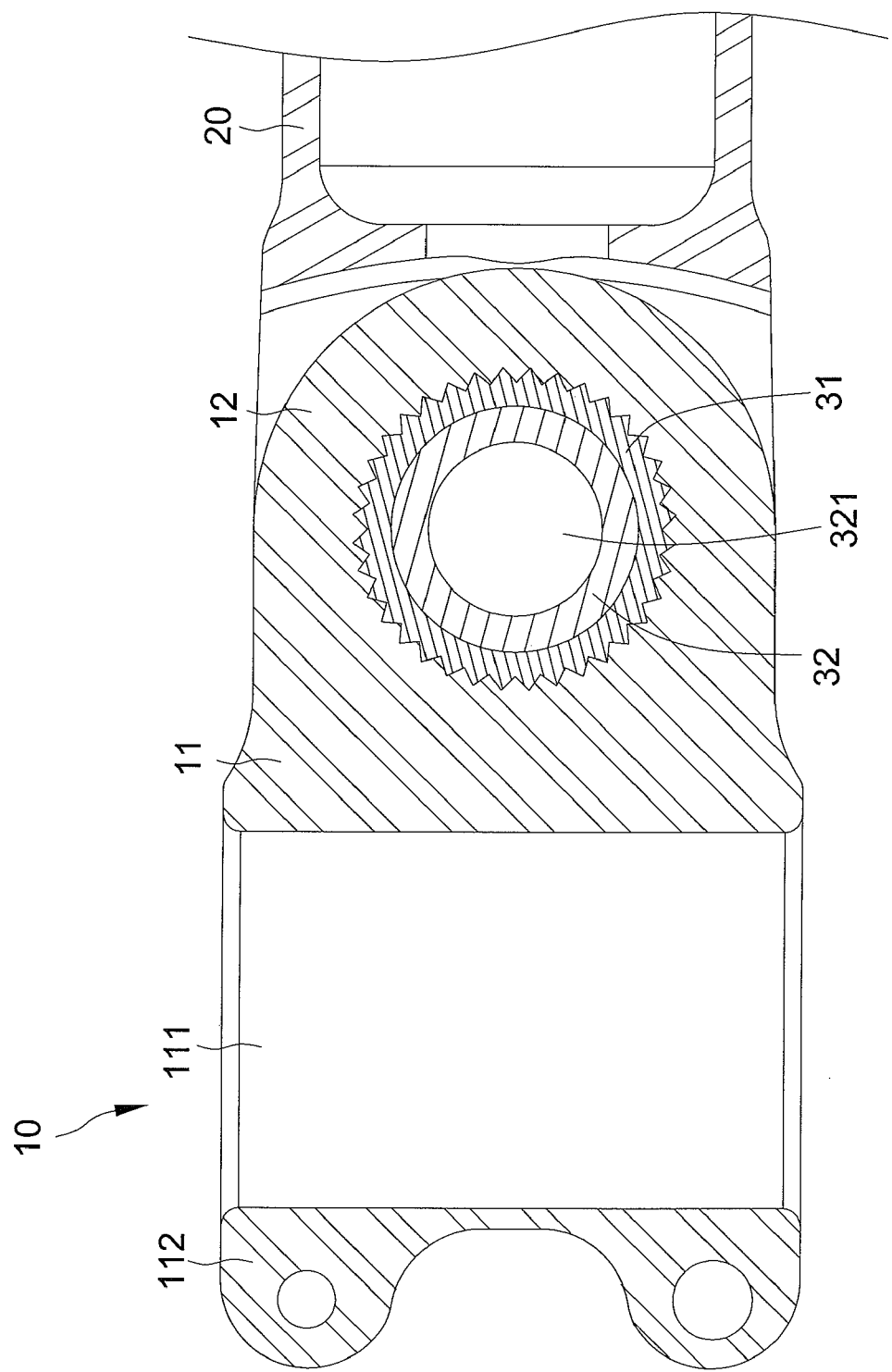
FIG. 5 is across-sectional view taken along line 5-5 in FIG. 4.
Figure 6:
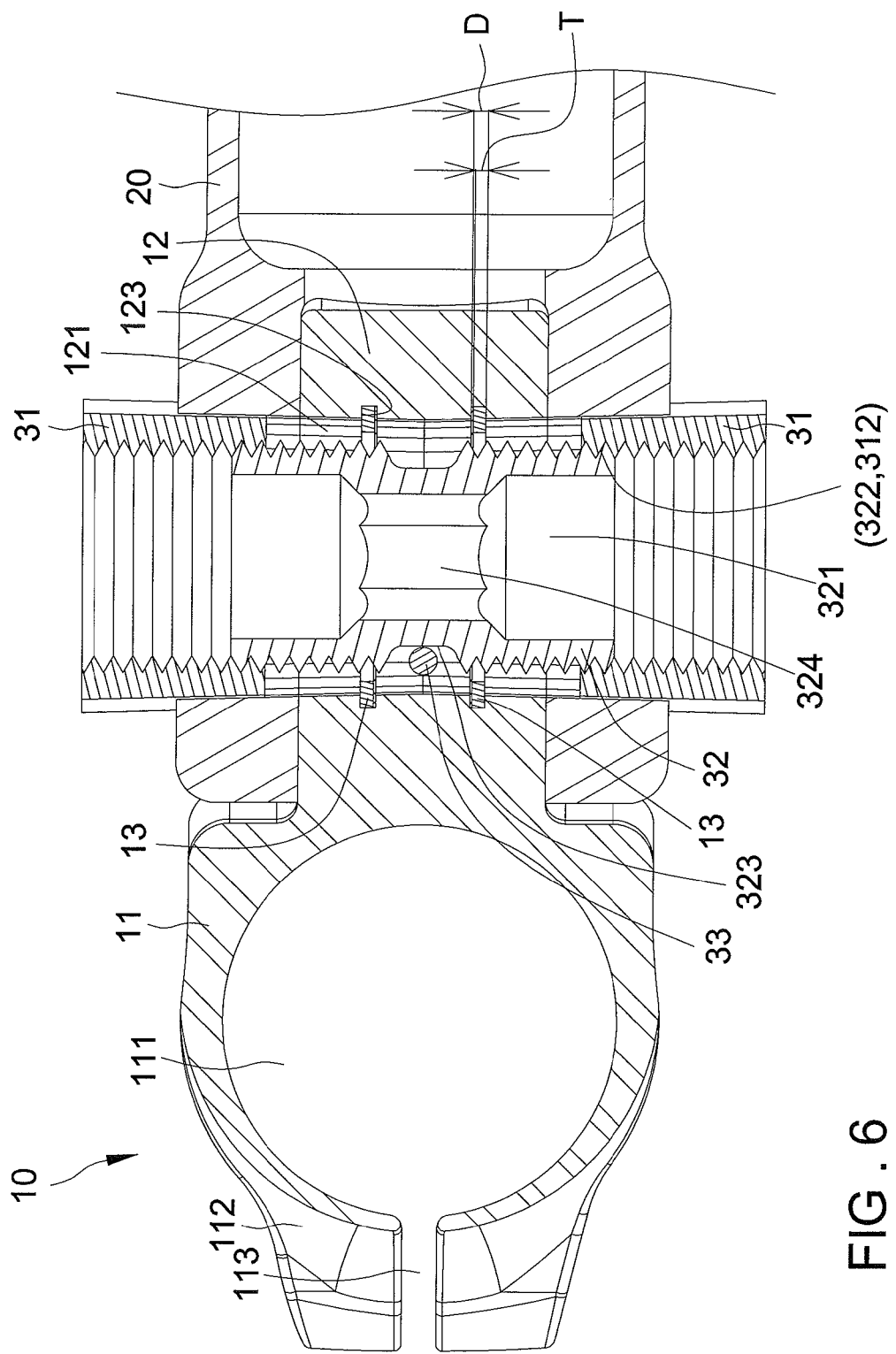
FIG. 6 is a cross-sectional view similar to FIG. 4, illustrating that the lock sleeves are operated to detach from two ends of the engaged bolt respectively while the lock unit is in the second position.

Referring to FIGS. 4 and 6, while the lock unit 30 is in a first position, as shown in FIG. 4, the outer threaded periphery 322 of the engaged bolt 32 is completely engaged with the inner threaded surface 312 of each lock sleeve 31, and two sides of the coupled end 21 of the clamp arm 20 are flat without protruding as shown in FIG. 1. It should be realized that the inner diameter of each blocking device 13 is smaller than an outer diameter of each lock sleeve 31. While the lock unit 30 is in the first position, a side of each lock sleeve 31 adjacent to the inside of the pivotal hole 121 abuts against the related blocking device 13, and the lock sleeve 31 is prevented from further inserting toward the annular groove 323 of the engaged bolt 32. The outer toothed surface 313 of each lock sleeve 31 is engaged with the toothed surface 122 of the pivotal end 12 and the related inner toothed surface 214 of the coupled end 21 simultaneously. Thus, the steerer tube base 10 is fixed in position and prevented from pivoting with respect to the clamp arm 20.

While the lock unit 30 is in a second position, as shown in FIG. 6, the two lock sleeves 31 are operated to disengage from the ends of the engaged bolt 32. Users can operate a hexagonal wrench to be inserted into the channel 321 and engage with the hexagonal hole 324 of the engaged bolt 32. Further, the engaged bolt 32 is driven to rotate with respect to the pivotal hole 121 and drives the lock sleeves 31. Because the engaged bolt 32 is restricted by the blocking element 33, the lock sleeves 31 are driven to disengage from the ends of the engaged bolt 32 and move outward with respect to the pivotal hole 121 and the connected bores 213. Then, the outer toothed surface 313 of each lock sleeve 31 is disengaged from the toothed surface 122 of the pivotal end 12. Thus, the clamp arm 20 can be pivoted with respect to the steerer tube base 10.

Figure 7:
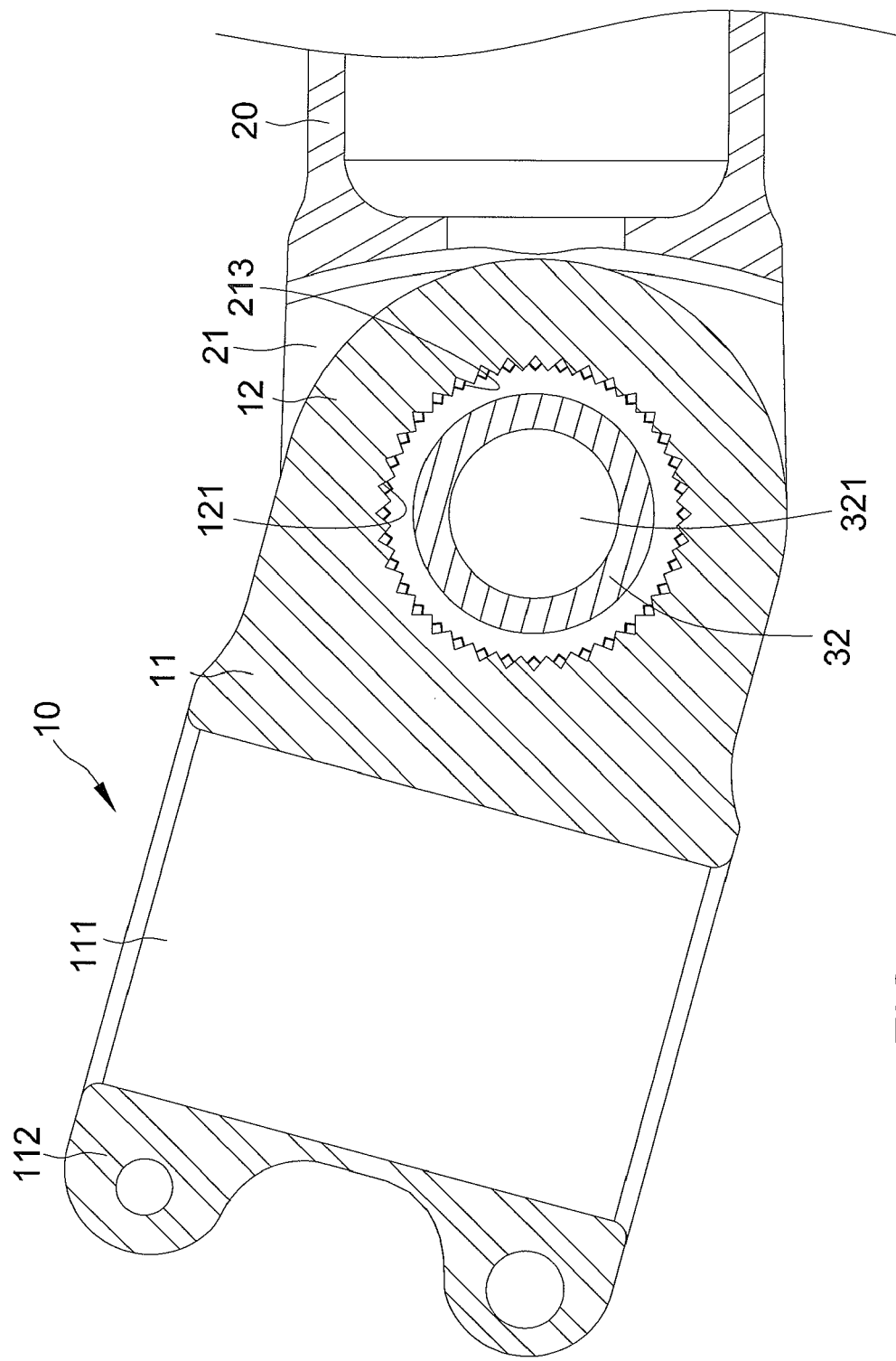
FIG. 7 is a cross-sectional view similar to FIG. 5, illustrating that while in the second position of the lock unit, the coupled end of the clamp arm is able to pivot with respect to the pivotal end of the steerer tube base.
Figure 8:
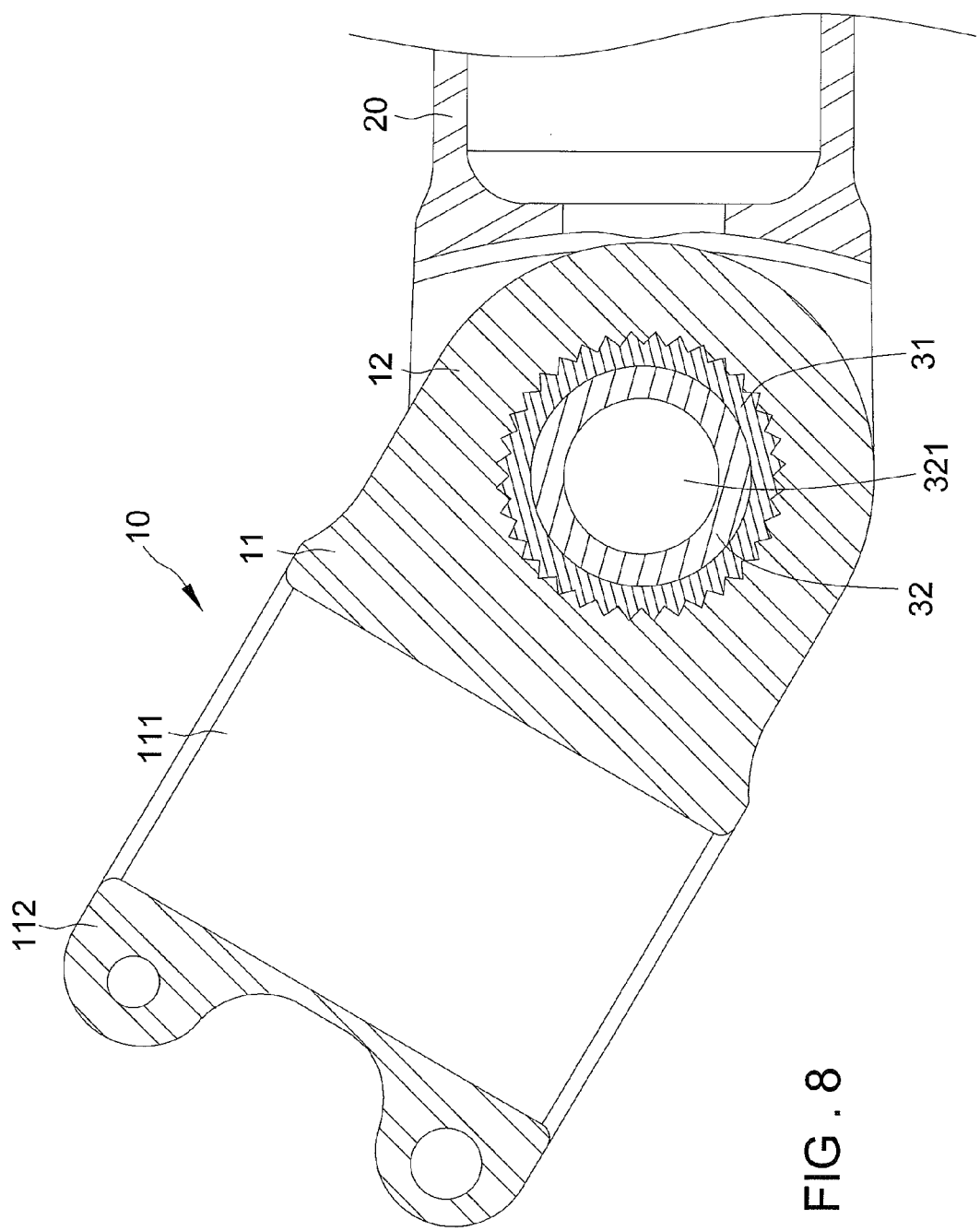
FIG. 8 is a is a cross-sectional view similar to FIG. 7, illustrating that while in the first position of the lock unit, the coupled end of the clamp arm is fixed and cannot pivot with respect to the pivotal end of the steerer tube base.

FIG. 7 shows that the lock unit 30 is in the second position and that the clamp arm 20 can be pivoted with respect to the steerer tube base 10. Users can pivot the steerer tube base 10 with respect to the clamp arm 20 and drive the steerer tube base 10 to a position at a desired angle related to the clamp arm 20. Further, as shown in FIG. 8, users can operate the lock unit 30 to return to the first position, and the clamp arm 20 is fixed with respect to the steerer tube base 10 in position and prevented from pivoting with respect to the steerer tube base 10.

Figure 9:
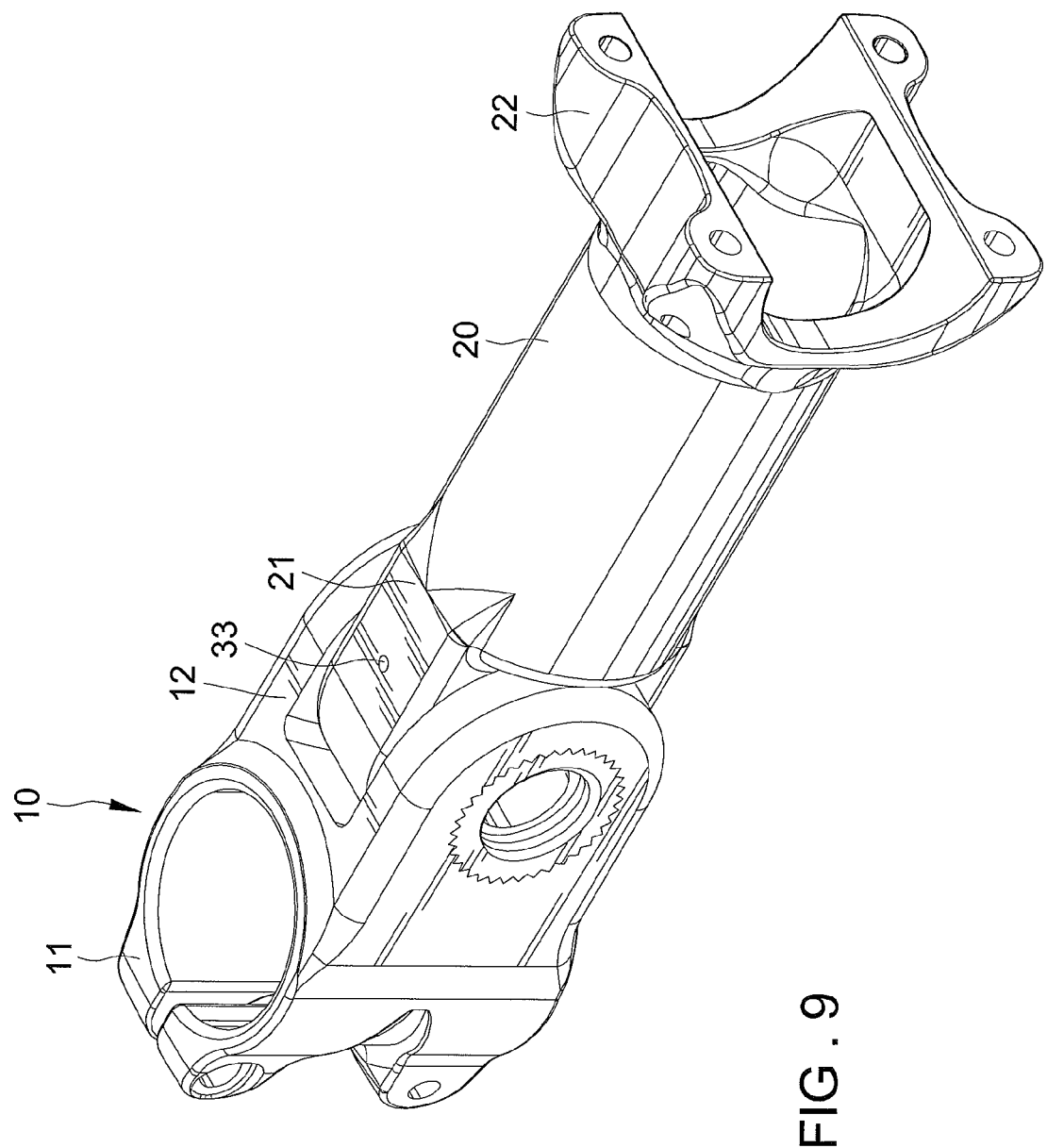
FIG. 9 is a perspective view of a bicycle stem according to another preferred embodiment of the present invention.

Moreover, FIG. 9 shows that another bicycle stem 1 in accordance with another preferred embodiment of the present invention is similar to the embodiment shown in FIGS. 1 through 8 except for several features as follows.

The end of the steerer tube base 10 opposite to the mounted end 11 includes two spaced lateral walls and a receptacle defined between the lateral walls thereof and is in the form of the coupled end 21 of the clamp arm 20 as shown in FIGS. 1 through 8. The coupled end 21, in this case, is preferably in the form of the pivotal end 12 of the steerer tube base 10 as shown in FIGS. 1 through 8. The receptacle of the steerer tube base 10 is adapted to receive the pivotal end of the clamp arm 20. The blocking devices 13 (not shown in this drawing) are disposed in the pivotal end of the clamp arm 20, and the blocking element 33 is inserted through the pivotal end of the clamp arm 20 for preventing the engaged bolt 32 from detaching from the pivotal end of the clamp arm 20.

What has been described and illustrated herein are preferred embodiments of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents), in which all terms are meant in their broadest reasonable sense unless otherwise indicated. Any headings utilized within the description are for convenience only and have no legal or limiting effect.

What is claimed is:

1. A bicycle stem comprising:
a steerer tube base including a pivotal end having a pivotal hole and two blocking devices provided in the pivotal end and protruding from an inner side of the pivotal hole;
a clamp arm including a coupled end pivotally coupled to the pivotal end; and
a lock unit, which is operable between a first position and a second position, including two lock sleeves, an engaged bolt operably rotated and disposed in the pivotal hole of the pivotal end and rotatably engaging the two lock sleeves, and a blocking element for preventing the engaged bolt detaching from the pivotal end, with the blocking devices respectively preventing the two lock sleeves completely inserting into the pivotal hole of the pivotal end, wherein the two lock sleeves rotate simultaneously upon operation of the engaged bolt;
wherein each lock sleeve includes a through-hole engaged with an end of the engaged bolt and an outer toothed surface engaged with the pivotal hole of the pivotal end and the coupled end;
wherein in the first position of the lock unit, the lock sleeves are engaged with the pivotal hole of the pivotal end and the coupled end of the clamp arm simultaneously, with the steerer tube base fixed and the clamp arm being not able to pivot with respect to the steerer tube base; and
wherein in the second position of the lock unit, the engaged bolt rotates with respect to the pivotal end and drives the lock sleeves to disengage from the pivotal hole of the pivotal end, with the clamp arm able to be driven to pivot with respect to the steerer tube base to a desired position.

2. The bicycle stem as claimed in claim 1 further comprising two slots axially formed on the inner side of the pivotal hole of the pivotal end and spaced from each other, with the two blocking devices provided in the slots respectively.

3. The bicycle stem as claimed in claim 2 wherein each blocking device has a thickness and each slot has a depth which is larger than the thickness of each blocking device.

4. The bicycle stem as claimed in claim 1 wherein the coupled end includes two spaced lateral walls and a receptacle defined between the two spaced lateral walls thereof receiving the pivotal end of the steerer tube case, with each lateral wall forming with a connected bore and corresponding to the pivotal hole, with the two lock sleeves being axially spaced on the engaged bolt greater in the second position than in the first position, and with the lock unit provided to insert through the connected bores and the pivotal hole, wherein the outer toothed surface of each lock sleeve is engaged with the pivotal hole of the coupled end and a corresponding connected bore of the pivotal end in the first position.

5. The bicycle stem as claimed in claim 4 wherein the pivotal end further has a toothed surface formed on the pivotal hole, each lock sleeve further includes an outer toothed surface formed on the outer periphery, and the coupled end further includes a toothed surface formed on the inner periphery of each connected bore; wherein in the first position of the lock unit, the outer toothed surface of each lock sleeve is engaged with the toothed surface of the pivotal hole and the toothed surface of the corresponding connected bore simultaneously; wherein in the second position of the lock unit, the outer toothed surface of each lock sleeve is disengaged from the toothed surface of the pivotal hole but engaged with the toothed surface of the corresponding connected bore.

6. The bicycle stem as claimed in claim 1 further comprising an annular groove formed on the outer periphery of the engaged bolt, with the blocking element inserted through the pivotal end longitudinally and restricted in the annular groove.

7. The bicycle stem as claimed in claim 6 further comprising an aperture formed on the pivotal end longitudinally and communicating with the pivotal hole, with a direction of the aperture being perpendicular to that of the pivotal hole.

8. The bicycle stem as claimed in claim 6 wherein the inner diameter of each blocking device is smaller than an outer diameter of each lock sleeve, wherein in the first position, a side of each lock sleeve adjacent to an inside of the pivotal hole abuts against the related blocking device and the lock sleeve is prevented from further inserting toward the annular groove of the engaged bolt.

9. The bicycle stem as claimed in claim 1 wherein the engaged bolt includes a channel axially formed therethrough and a hexagonal hole formed inside of the channel and communicating with the channel.

10. The bicycle stem as claimed in claim 1 wherein the steerer tube base includes a mounted end adapted to couple to a steerer tube of a bicycle, with the mounted end including a through-hole longitudinally formed at the mounted end and consisting of two lateral walls and a gap defined between the distal ends of the two lateral walls, with a direction of the through-hole being perpendicular to that of the pivotal hole.

11. The bicycle stem as claimed in claim 1 further comprising an inner threaded surface formed on an inner periphery of each lock sleeve and an outer threaded periphery formed on an outer periphery of the engaged bolt and engaged with the inner threaded surface of each lock sleeve.

12. The bicycle stem as claimed in claim 1 further comprising a holder end formed on an end of the clamp arm opposite to the coupled end of the clamp arm to clamp a bicycle handlebar.

13. The bicycle stem as claimed in claim 1 wherein each of the two blocking devices is integrally formed into a center portion as a step in the pivotal hole.

14. A bicycle stem comprising:
a clamp arm including a coupled end;

a steerer tube base including a pivotal end pivotally coupled to the coupled end;
one of the coupled end and the pivotal end having a pivotal hole and two blocking devices provided therein and protruding from an inner side of the pivotal hole; and
a lock unit, which is operable between a first position and a second position, including two lock sleeves, an engaged bolt operably rotated and disposed in the pivotal hole of the coupled end and rotatably engaging the two lock sleeves, and a blocking element for preventing the engaged bolt detaching from the coupled end, with the blocking devices respectively preventing the two lock sleeves completely inserting into the pivotal hole of the coupled end, wherein the two lock sleeves rotate simultaneously upon the operation of the engaged bolt, wherein the engaged bolt includes a channel axially formed therethrough and a hole formed inside thereof and communicating with the channel;
wherein each lock sleeve includes a through-hole engaged with an end of the engaged bolt and an outer toothed surface operably engaged with a toothed surface of the pivotal hole of the coupled end and an inner toothed surface of the pivotal end;
wherein in the first position of the lock unit, the lock sleeves are engaged with the pivotal hole of the coupled end and the pivotal end of the steerer tube base simultaneously, with the steerer tube base fixed and the clamp arm being not able to pivot with respect to the steerer tube base;
wherein in the second position of the lock unit, the engaged bolt rotates with respect to the coupled end of the clamp arm and drives the lock sleeves to disengage from the pivotal hole of the coupled end, with the clamp arm able to be driven to pivot with respect to the steerer tube base to a desired position.

15. The bicycle stem as claimed in claim 14 further comprising two slots axially formed on the inner side of the pivotal hole of the coupled end and spaced from each other, with the two blocking devices provided in the slots respectively.

16. The bicycle stem as claimed in claim 14 wherein the pivotal end of the steerer tube base includes two spaced lateral walls and a receptacle defined between the lateral walls thereof receiving the coupled end of the clamp arm, with each lateral wall forming with a connected bore and corresponding to the pivotal hole, with the two lock sleeves being axially spaced on the engaged bolt greater in the second position than in the first position, and with the lock unit provided to insert through the connected bores and the pivotal hole, wherein the outer toothed surface of each lock sleeve is engaged with the pivotal hole of the coupled end and a corresponding connected bore of the pivotal end in the first position.

17. The bicycle stem as claimed in claim 14 further comprising an annular groove formed on the outer periphery of the engaged bolt, with the blocking element inserted through the coupled end longitudinally and restricted in the annular groove.

18. The bicycle stem as claimed in claim 17 further comprising an aperture formed on the coupled end longitudinally and communicating with the pivotal hole, with a direction of the aperture being perpendicular to that of the pivotal hole.

19. The bicycle stem as claimed in claim 17 wherein the inner diameter of each blocking device is smaller than an outer diameter of each lock sleeve, wherein in the first position, a side of each lock sleeve adjacent to an inside of the pivotal hole abuts against the related blocking device and the lock sleeve is prevented from further inserting toward the annular groove of the engaged bolt.

* * * * *